United States Patent
Dowle et al.

(10) Patent No.: US 9,857,492 B2
(45) Date of Patent: Jan. 2, 2018

(54) VARIABLE-DEPTH SEISMIC SOURCE AND METHOD

(71) Applicant: CGG SERVICES SA, Massy (FR)

(72) Inventors: Robert Dowle, Massy (FR); Thierry Payen, Massy (FR)

(73) Assignee: CGG SERVICES SAS, Massy (FR)

( * ) Notice: Subject to any disclaimer, the term of this patent is extended or adjusted under 35 U.S.C. 154(b) by 668 days.

(21) Appl. No.: 13/973,373

(22) Filed: Aug. 22, 2013

(65) Prior Publication Data

US 2014/0112097 A1 Apr. 24, 2014

(30) Foreign Application Priority Data

Oct. 24, 2012 (FR) ...................... 12 60122

(51) Int. Cl.
*G01V 1/38* (2006.01)
(52) U.S. Cl.
CPC .................. *G01V 1/3861* (2013.01)
(58) Field of Classification Search
USPC .......................................................... 367/23
See application file for complete search history.

(56) References Cited

U.S. PATENT DOCUMENTS

| | | | |
|---|---|---|---|
| 4,254,480 A | 3/1981 | French | |
| 4,716,553 A | 12/1987 | Dragsund et al. | |
| 4,721,180 A | 1/1988 | Haughland et al. | |
| 4,831,599 A * | 5/1989 | Dragsund et al. | 367/15 |
| 4,956,822 A | 9/1990 | Barber et al. | |
| 5,138,582 A | 8/1992 | Furu | |
| 5,841,733 A * | 11/1998 | Bouyoucos et al. | 367/15 |
| 6,493,636 B1 * | 12/2002 | DeKok | 702/17 |
| 8,014,228 B2 * | 9/2011 | Schreurs et al. | 367/16 |
| 2011/0176384 A1 | 7/2011 | Soubaras | |
| 2012/0287752 A1 | 11/2012 | Payen et al. | |

FOREIGN PATENT DOCUMENTS

| | | |
|---|---|---|
| EP | 0168959 A1 | 1/1986 |
| FR | 2664709 A1 | 1/1992 |
| GB | 2152216 A | 7/1985 |

(Continued)

OTHER PUBLICATIONS

Cambois, Guillaume, et al. "Multi-level airgun array: A simple and effective way to enhance the low frequency content of marine seismic data." 2009 SEG Annual Meeting. Society of Exploration Geophysicists, 2009.*

(Continued)

*Primary Examiner* — James R Hulka
*Assistant Examiner* — John T Nolan
(74) *Attorney, Agent, or Firm* — Patent Portfolio Builders PLLC

(57) ABSTRACT

Method and marine acoustic source array for generating an acoustic wave in a body of water. The marine acoustic source array includes at least one sub-array. The at least one sub-array includes a float from which plural source points are attached. The source points may be provided on a curved line, straight line, or other desired shape so that a variable-depth source is obtained with a single float. The source points may be divided into groups and the groups may be provided on the curved line, straight line or other desired shape.

17 Claims, 21 Drawing Sheets

(56) References Cited

FOREIGN PATENT DOCUMENTS

| WO | 2008073178 A2 | 6/2008 | |
|---|---|---|---|
| WO | WO2008073178 A2 * | 6/2008 | ............. G01B 17/06 |
| WO | 2009005939 A1 | 1/2009 | |

OTHER PUBLICATIONS

Berkhout, A. J. "Blended acquisition with dispersed source arrays." Geophysics 77.4 (2012): A19-A23.*
G. Smith, "Three-Dimensional Air Gun Arrays", SEG Technical Program Expanded Abstracts, 1084, pp. 282-285, XP-002698873.
French Preliminary Search Report dated Jun. 14, 2013, in related application FR 1260122.
French Preliminary Search Report dated Jun. 17, 2013, in related application FR 1260127.
Office Action in related U.S. Appl. No. 13/973,390 dated Jan. 15, 2016.
Non-Final Office Action in related U.S. Appl. No. 13/973,390 dated Jul. 22, 2016. (Non-patent literature reference previously submitted with an Information Disclosure Statement on Aug. 22, 2013.)

* cited by examiner

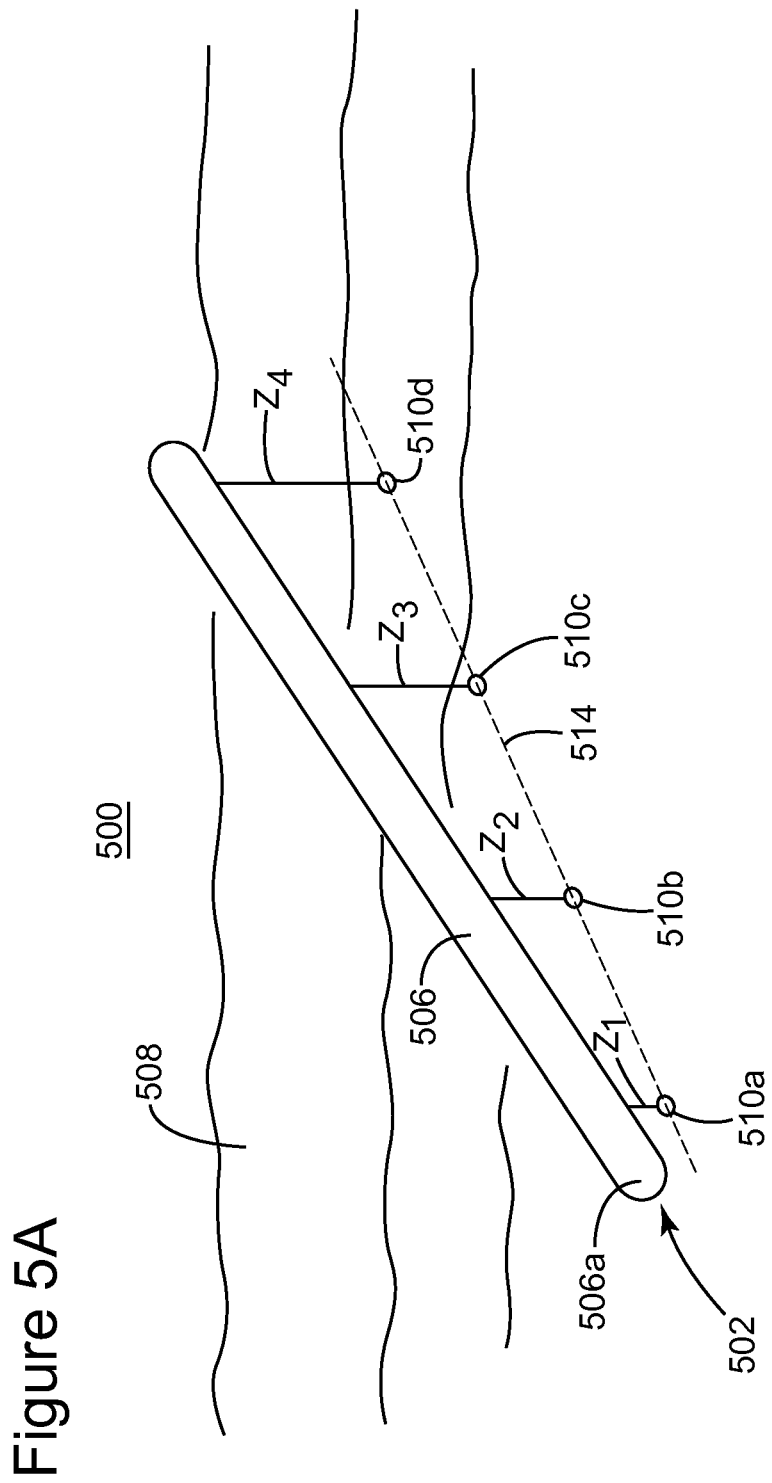

VARIABLE-DEPTH SEISMIC SOURCE AND METHOD

BACKGROUND

Technical Field

Embodiments of the subject matter disclosed herein generally relate to methods and systems related to seismic exploration and, more particularly, to mechanisms and techniques for providing a variable-depth seismic source that can achieve strong low-frequency energy, smooth spectrum, and a reduced number of high-frequency ghost notches.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the structures under the seafloor is an ongoing process.

During a seismic gathering process, as shown in FIG. 1, a vessel 10 tows an array of seismic receivers 11 provided on streamers 12. The streamers may be disposed horizontally, i.e., lying at a constant depth relative to a surface 14 of the ocean. The streamers may be disposed to have other spatial arrangements than horizontally, e.g., variable-depth arrangement. The vessel 10 also tows a seismic source array 16 that is configured to generate a seismic wave 18. The seismic wave 18 propagates downward, toward the seafloor 20, and penetrates the seafloor until, eventually, a reflecting structure 22 (reflector) reflects the seismic wave. The reflected seismic wave 24 propagates upward until it is detected by the receiver 11 on streamer 12. Based on this data, an image of the subsurface is generated.

In an effort to improve the resolution of the subsurface's image, an innovative solution (BroadSeis system of CGG-Veritas, Massy, France) has been implemented based on broadband seismic data. The BroadSeis system may use Sentinel streamers (produced by Sercel, Nantes, France) with low noise characteristics and the ability to deploy the streamers in configurations allowing the recording of an extra octave or more of low frequencies. The streamers are designed to record seismic data while being towed at greater depths and are quieter than other streamers. Thus, the receivers of these streamers need a marine broadband source array.

A marine broadband source array may include one or more sub-arrays (usually three sub-arrays), and each sub-array may include plural source points (e.g., an airgun) provided along an X direction as shown in FIG. 2. FIG. 2 shows a single sub-array 17 having three source points 34. Such a source sub-array 17 includes a float 30 that may be connected to a vessel (not shown) via a connection 32. The float 30 is configured to float at the surface of the water or near the surface of the water and to support the plural source points 34. The source point may be not only an air gun but any other source known in the art. Source points 34 are suspended with appropriate cables 36 from the float 30 and also might be connected to each other by cables 38. An umbilical cable 40 may link one or more of the source points 34 to the vessel for providing a mechanical connection, and also electrical, pneumatic and/or communication cables. Source points 34 are typically provided at a same depth from a surface of the water.

Some disadvantages of such a source array are weak low-frequency energy, non-smooth spectrum, and the presence of high-frequency ghost notches. An alternate source array is discussed in WO 2009/005939, the entire content of which is incorporated herein by reference. This reference discloses using plural floats 40 floating at the surface 42 of the water as shown in FIG. 3. There are sub-arrays that include individual sources 44 provided at a first depth z1 and sub-arrays that include individual sources 46 provided at a second depth z2, larger than z1. However, such a configuration is still affected by the above-discussed disadvantages. Further, each float provides floating support for source elements situated at a same depth.

A source array that has better characteristics than the existing source arrays is disclosed in patent application Ser. No. 13/468,589, filed on May 10, 2012, and assigned to the same assignee as the present application, the entire disclosure of which is incorporated herein by reference. This source array is illustrated in FIG. 4 as source array 50. The source array 50 may include three different sub-arrays 60a-c, each sub-array having a corresponding float 52a-c, respectively. From each float a plurality of source points 64 is suspended. However, different from the existing sources, it is noted that source points 64 are suspended, from the same float, at two different depths, and the configuration of the source points attached to one float may be different from the configuration of the source points attached to another float. For example, FIG. 4 shows that the sub-array 60a has the higher depth source point behind the shallow source points along the direction Y while the sub-array 60c has the higher depth source point between the shallow source points along the Y direction.

However, even this improved source seems to have some limitations; for example, a natural mid-frequency "suck-out" about 10 dB in depth in its energy spectrum and lack of strong energy in the 80 to 120 Hz frequency interval.

Thus, it is desired to produce a new source array that overcomes these problems and achieves strong low-frequency energy, a smooth spectrum, and a reduced number of high-frequency ghost notches. Ghost notches occur when upwardly-travelling seismic energy is reflected or scattered downward at the sea surface. The ghost reflections are also detected by the seismic receivers and generate notches in the recorded data.

SUMMARY

According to one exemplary embodiment, there is a marine acoustic source array for generating an acoustic wave in a body of water. The marine acoustic source array includes a first sub-array configured to be towed by a vessel, the first sub-array including a first float and plural first source points connected to the first float. The plural first source points are divided into at least three groups (G1 to G3) and each group is provided at corresponding first depths (D1 to D3) and each group includes at least one source point.

According to another exemplary embodiment, there is a marine acoustic source array for generating an acoustic wave in a body of water. The marine acoustic source array includes a first sub-array configured to be towed by a vessel, the first sub-array including a first float and plural first source points connected to the first float. The plural first source points are provided at corresponding first depths (z1 to z4), each first depth being different from other first depths.

According to still another exemplary embodiment, there is a method for generating an acoustic wave underwater. The method includes towing a marine acoustic source array underwater, wherein the marine acoustic source array includes a first sub-array; connecting plural first source points of the first sub-array to a first float; and generating the acoustic wave with the plural first source points. The plural first source points are divided into at least three groups (G1 to G3) and each group is provided at corresponding first depths (D1 to D3).

According to yet another exemplary embodiment, there is a method for generating an acoustic wave underwater. The method includes towing underwater a marine acoustic source array that includes a first sub-array; connecting plural first source points to a first float of the first sub-array; and generating the acoustic wave with the plural first source points. The plural first source points are provided at corresponding first depths (z1 to z4), each first depth being different from other first depths.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 5A-B are schematic diagrams of variable-depth seismic sources according to exemplary embodiments;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a variable-depth source array being towed by a vessel. However, the embodiments to be discussed next are not limited to variable-depth source arrays, but may be applied to other seismic sources that have the source points distributed at plural depths, slanted or otherwise.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
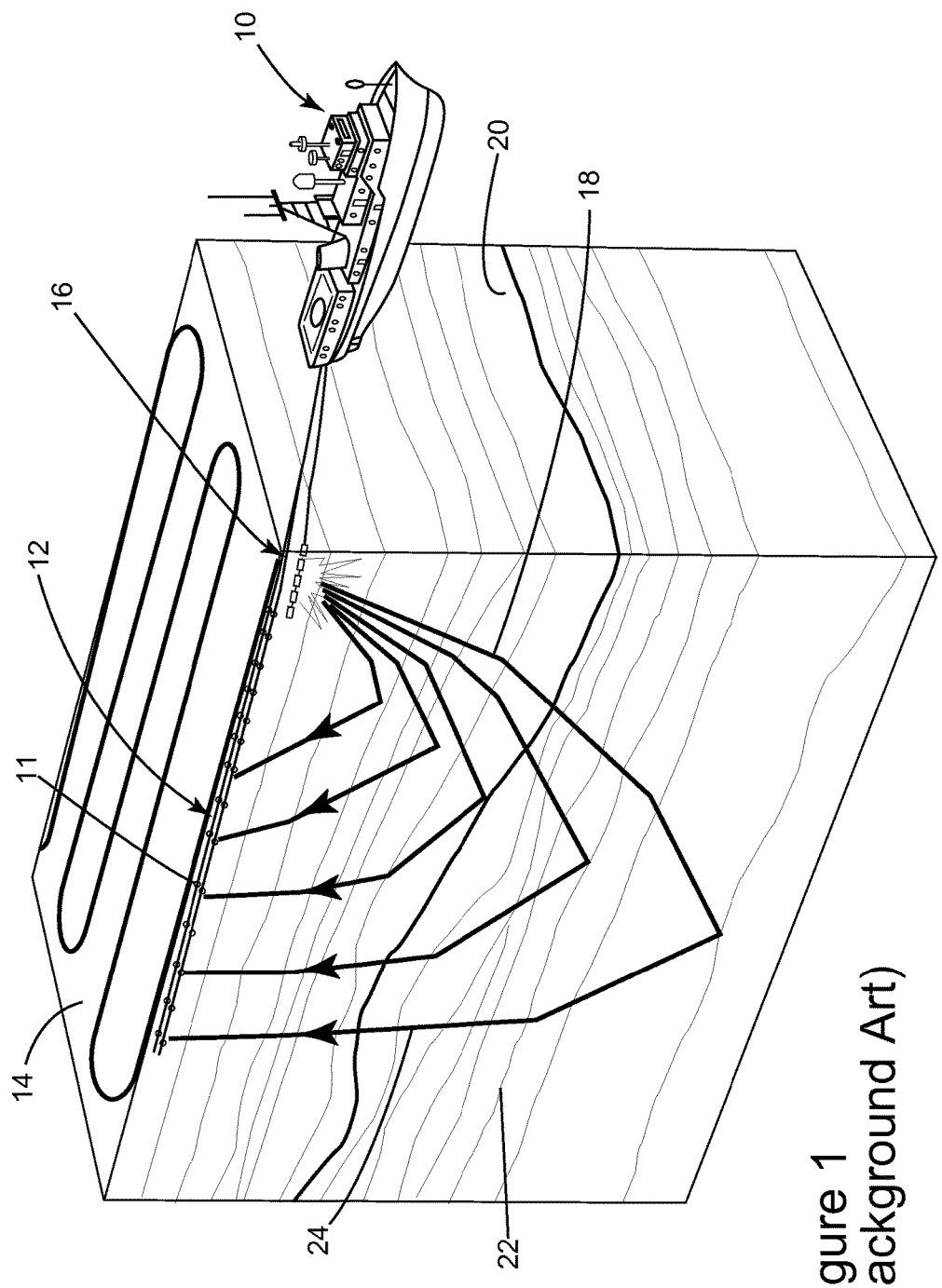
FIG. 1 is a schematic diagram of a conventional seismic survey system.
Figure 2:
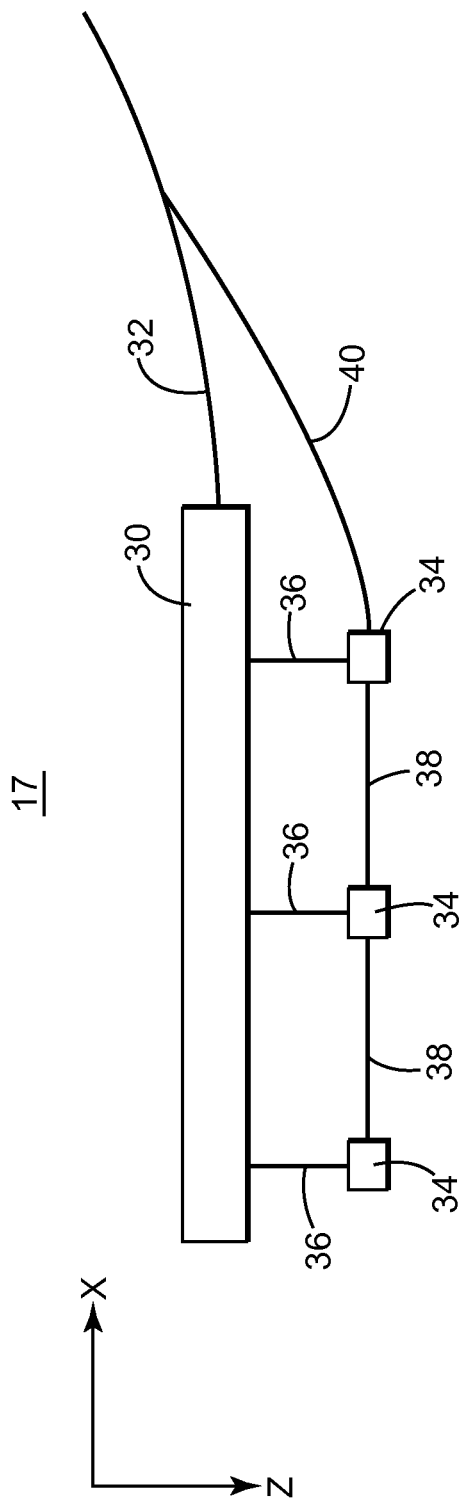
FIG. 2 is a schematic diagram of a float having a set of sources at a same depth.
Figure 3:
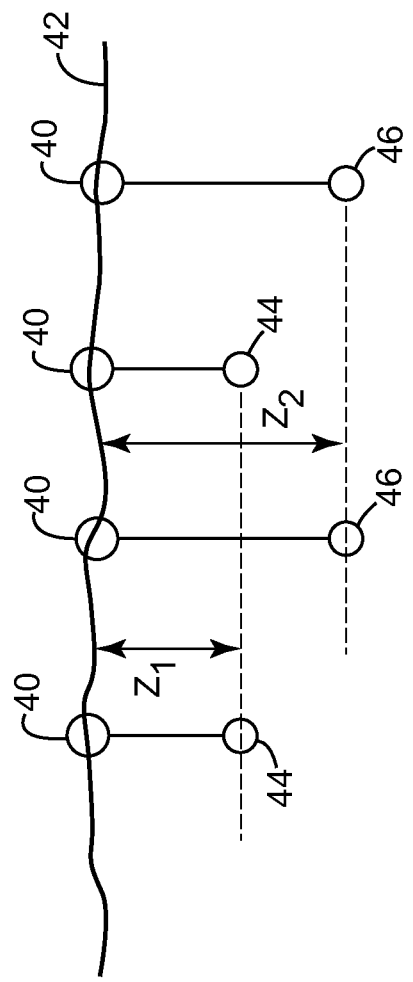
FIG. 3 is a schematic diagram of plural floats each having a set of sources at a predetermined single depth.
Figure 4:
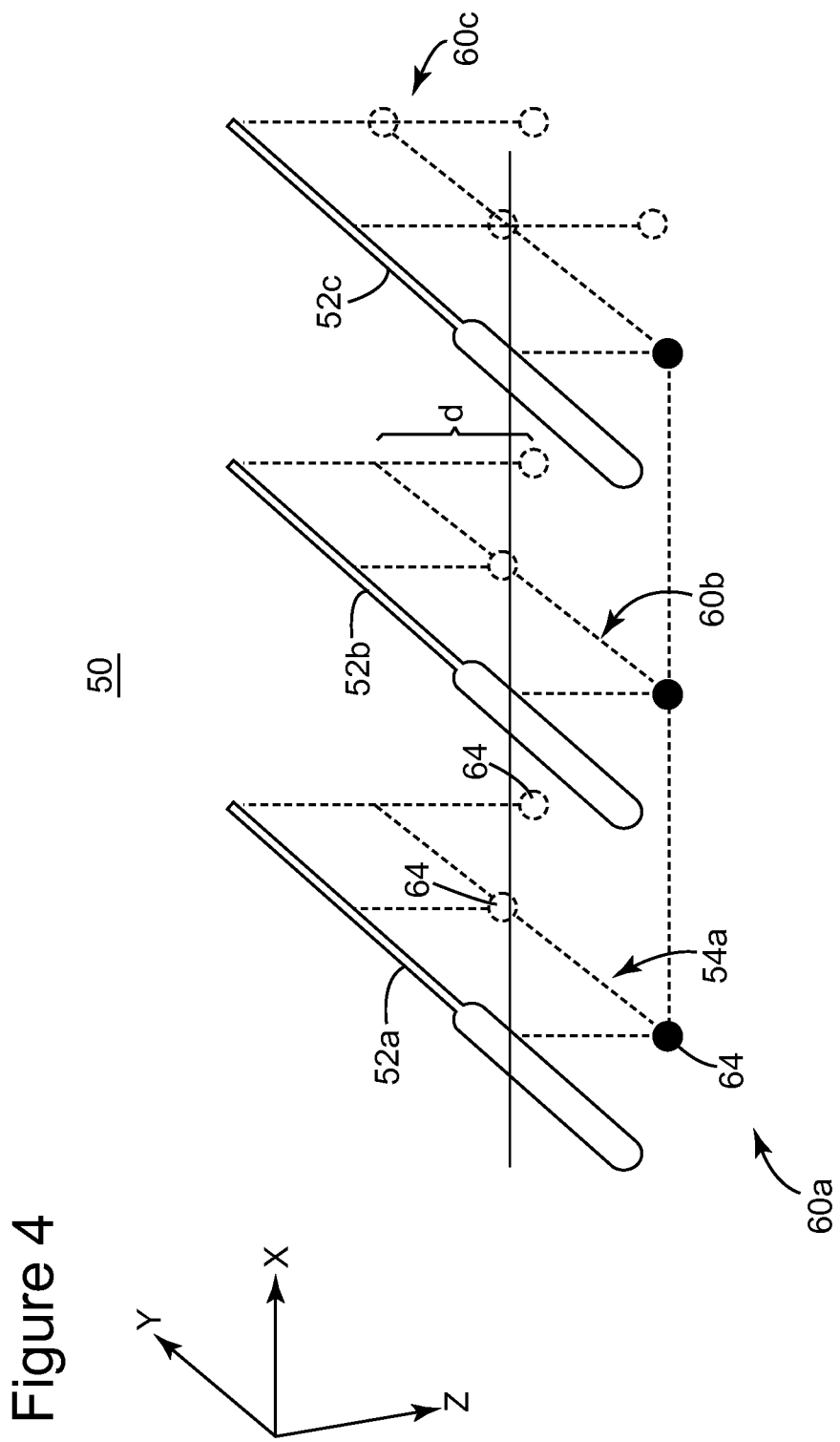
FIG. 4 is an overall view of plural floats each having two sets of sources distributed at two different depths according to an exemplary embodiment.
Figure 5B:
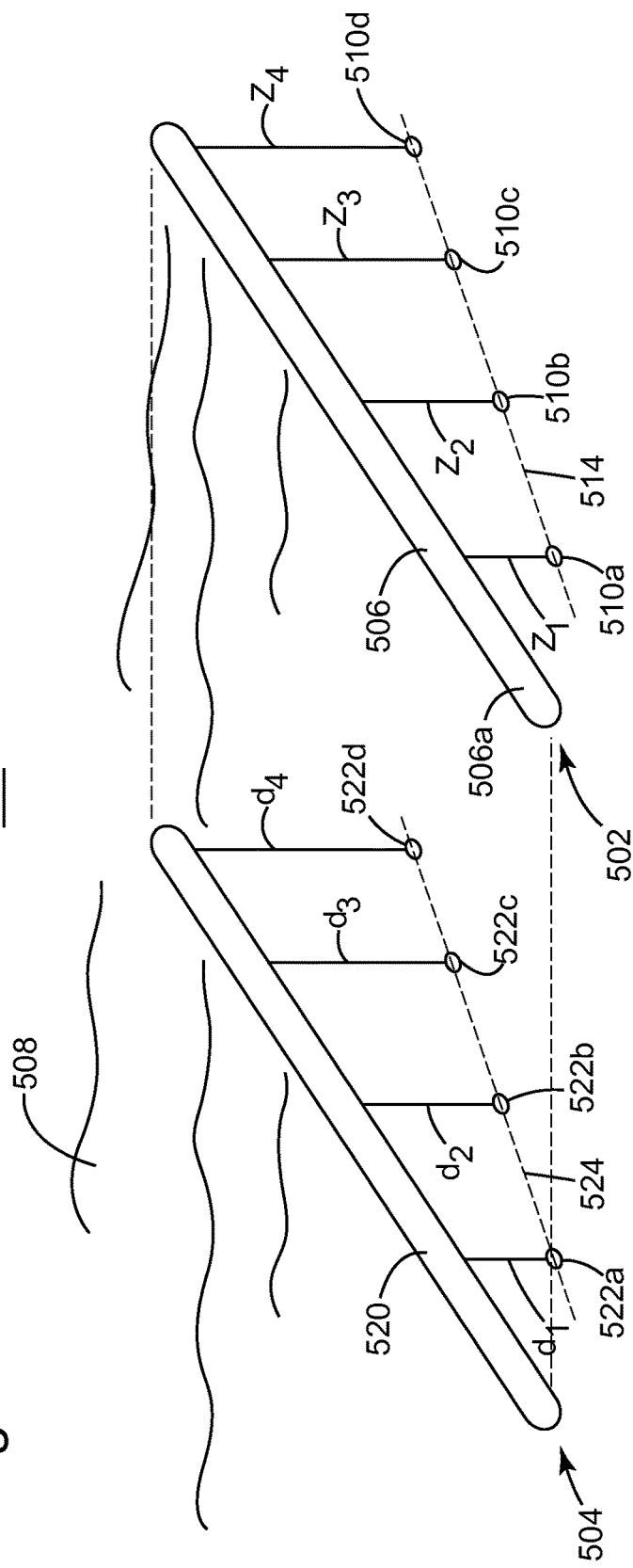

Emerging technologies in marine seismic surveys need a source array that achieves good gun volume diversity, smooth spectrum, strong low-frequency spectrum, and a superior suppression of notches. Such a source array was developed by the present inventors and is schematically illustrated in FIG. 5A as source array 500. The source array may include only a first sub-array 502. However, as shown in FIG. 5B, the source array 500 may include not only the first sub-array 502, but also a second sub-array 504. Alternative source arrays may have more than two sub-arrays.

The first sub-array 502 has a float 506 that is configured to float at the water surface 508 or underwater at a predetermined depth. Plural source points 510a-d are suspended from the float 506 in a known manner (one example of which is discussed later in FIG. 10). A first source point 510a may be suspended closest to the head 506a of the float 506, at a first depth z1. A second source point 510b may be suspended next, at a second depth z2, different from z1. A third source point 510c may be suspended next, at a third depth z3, different from z1 and z2, and so on. FIG. 5A shows, for simplicity, only four source points 510a-d, but an actual implementation may have any desired number of source points. In one application, because the source points are distributed at different depths, the source points at the different depths are not simultaneously activated. In other words, the source array is synchronized, i.e., a deeper source point is activated later in time (e.g., 2 ms for 3 m depth difference when the speed of sound in water is 1500 m/s) such that corresponding sound signals produced by the plural source points coalesce, and thus, the overall sound signal produced by the source array appears as being a single sound signal.

The depths z1 to z4 of the source points of the first sub-array 502 may obey various relationships. In one application, the depths of the source points increase from the head toward the tail of the float, i.e., z1<z2<z3<z4. In another application, the depths of the source points decrease from the head to the tail of the float. In another application, the source points are slanted, i.e., provided on an imaginary line 514. In still another application, the line 514 is a straight line. In yet another application, the line 514 is a curved line, e.g., part of a parabola, circle, hyperbola, etc. In one application, the depth of the first source point for the sub-array 502 is about 5 m and the largest depth of the last source point is about 8 m. In a variation of this embodiment, the depth range is between 8.5 and 10.5 m or between 11 and 14 m. In another variation of this embodiment, when the line 514 is straight, the depths of the source points increase by 0.5 m from a source point to an adjacent source point. Those skilled in the art would recognize that these ranges are exemplary and these numbers may vary from survey to survey. A common feature of all these embodiments is that the source points have variable depths so that a single sub-array exhibits multiple-level source points.

A second sub-array 504, which is illustrated in FIG. 5B, also includes a float 520 and plural source points 522a-d suspended from the float 520. The depths d1 to d4 of the source points also vary from the first source point to the last source point in the sub-array 504. While the depths d1-d4 may vary similar to the depths z1 to z4 of the first sub-array, it may be more advantageous to have the depths d1 to d4 complement the depths z1 to z4 as discussed next.

For example, the depth d1 (the smallest of the depths d1 to d4) may be larger than the largest depth z4 of the first sub-array 504. Thus, the source points 522a-d may be provided on a line 524 that, similar to line 514 of the first sub-array, may be linear, curved, etc. In one application, the depths of the source points 522a-d increase from the head toward the tail of the float, i.e., d1<d2<d3<d4. In another application, the depths of the source points decrease from the head to the tail of the float. In another application, the source points are slanted, i.e., provided on the imaginary line 524. In still another application, the line 524 is a straight line. In yet another application, the line 524 is a curved line, e.g., part of a parabola, circle, hyperbola, etc. In one application, the depth of the first source point for the sub-array 504 is about 5 m, and the largest depth of the last source point is about 8 m. In a variation of this embodiment, the depth range is between 8.5 and 10.5 or between 11 and 14 m. In another variation of this embodiment, when the line 524 is straight, the depth of the source points increases by 0.5 m from a source point to an adjacent source point. Those skilled in the art would recognized that these ranges are exemplary and these numbers may vary from survey to survey. A common feature of all these embodiments is that the source points 522a-d have variable depths so that a single sub-array exhibits multiple-level source points.

Figure 6A:
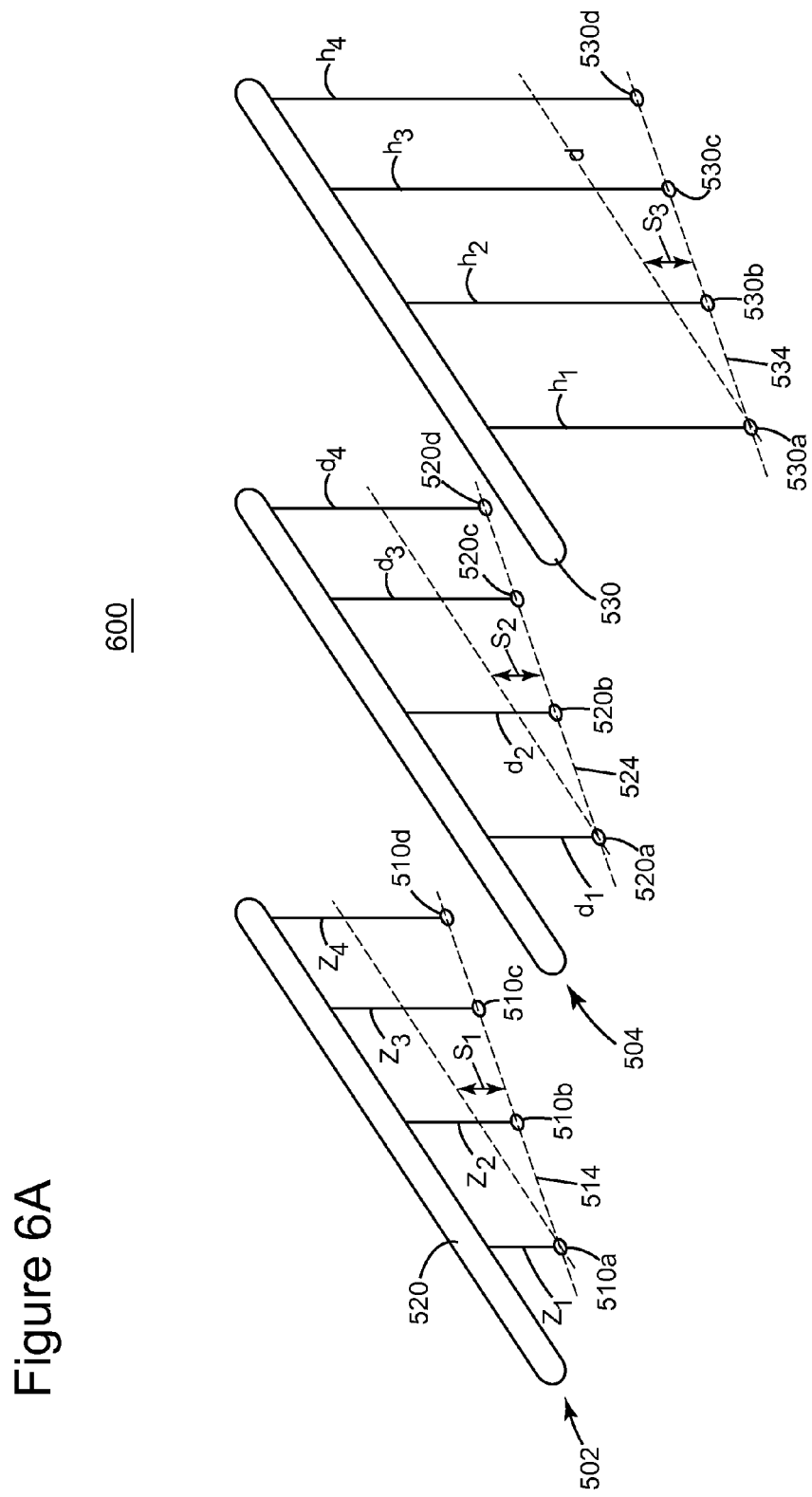
FIGS. 6A-D are schematic diagrams of other variable-depth seismic sources according to exemplary embodiments.

In still another exemplary embodiment illustrated in FIG. 6A, the first sub-array 502 has the source points 510a-d distributed at depths between 5 and 8 m, the second sub-array 504 has the source points 520a-d distributed at depths between 8.5 and 10.5 m, and a third sub-array 530 (also having source points 530a-d distributed on a line 534, that might be linear or curved) has the source points 530a-d distributed at depths between 11 and 14 m. In this way, a source array 600 covers depths between 5 and 14 m, with each sub-array having the source points distributed on imaginary lines 514, 524, and 534, respectively, the lines being linear, curved or a combination thereof.

In one exemplary embodiment, the imaginary lines 514, 524 and 534 are straight lines and the source point depths increase with a predetermined step s (e.g., 0.5 m) not only within the same sub-array, but also from sub-array to next sub-array. However, in another exemplary embodiment, the source point depths increase with a predetermined step s1 for the first sub-array, a second step s2 for the second sub-array and a third step s3 for the third sub-array. The steps may be different from sub-array to sub-array or the same, i.e., s1=s2=s3.

For example, it is possible to achieve a source array that has seven or more depth levels for the various source points that make up the source array. The exemplary embodiment of FIG. 6A shows each source point being provided at a different depth, i.e., achieving 12 depth levels. However, as discussed previously, the source points may be provided on a curved line and not on a linear line (i.e., to not be slanted).

Figure 6B:
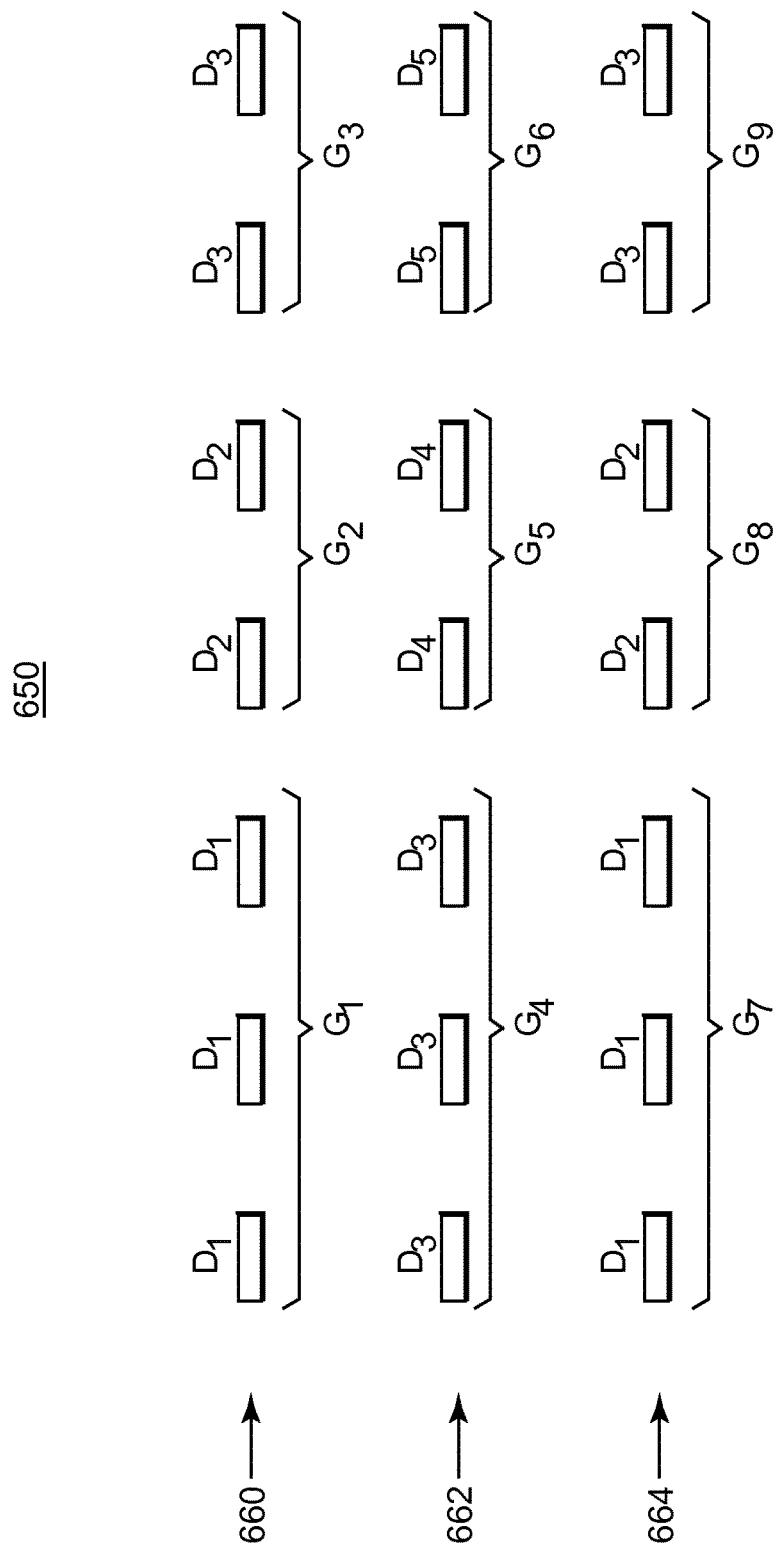
Figure 6C:
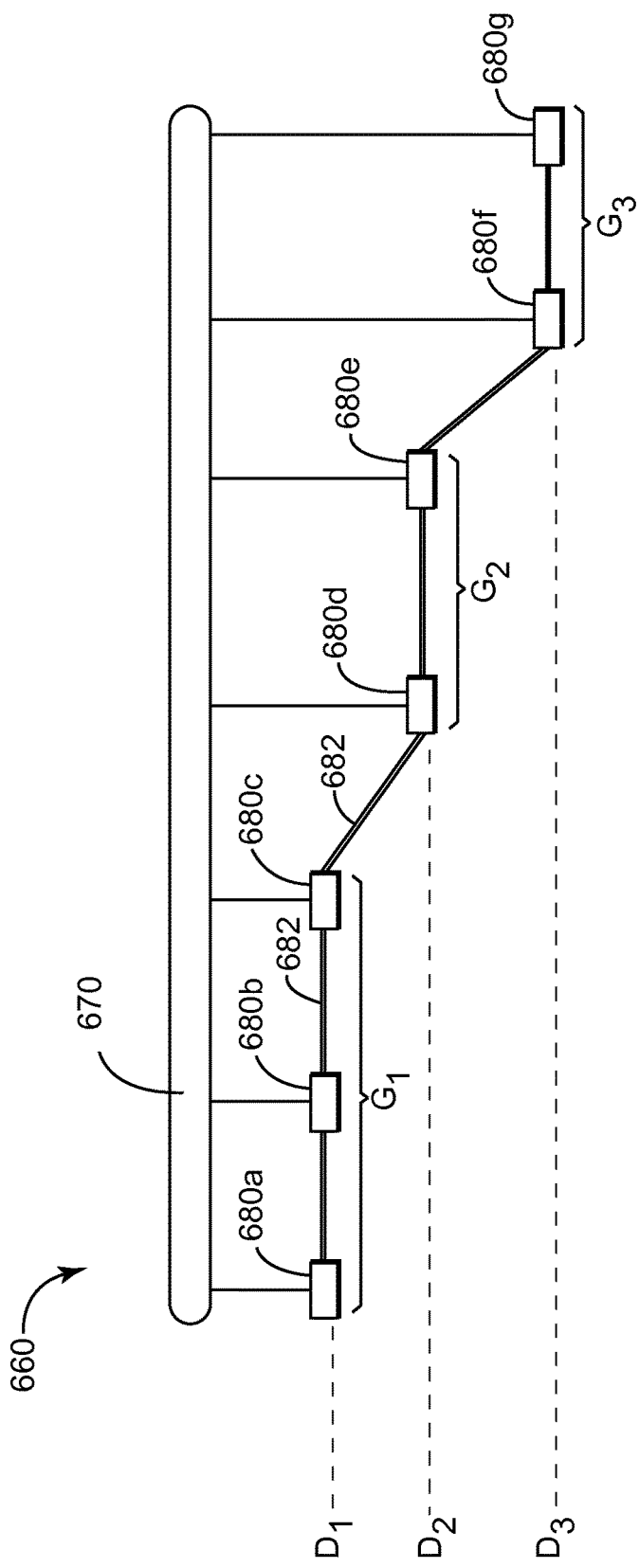
Figure 6D:
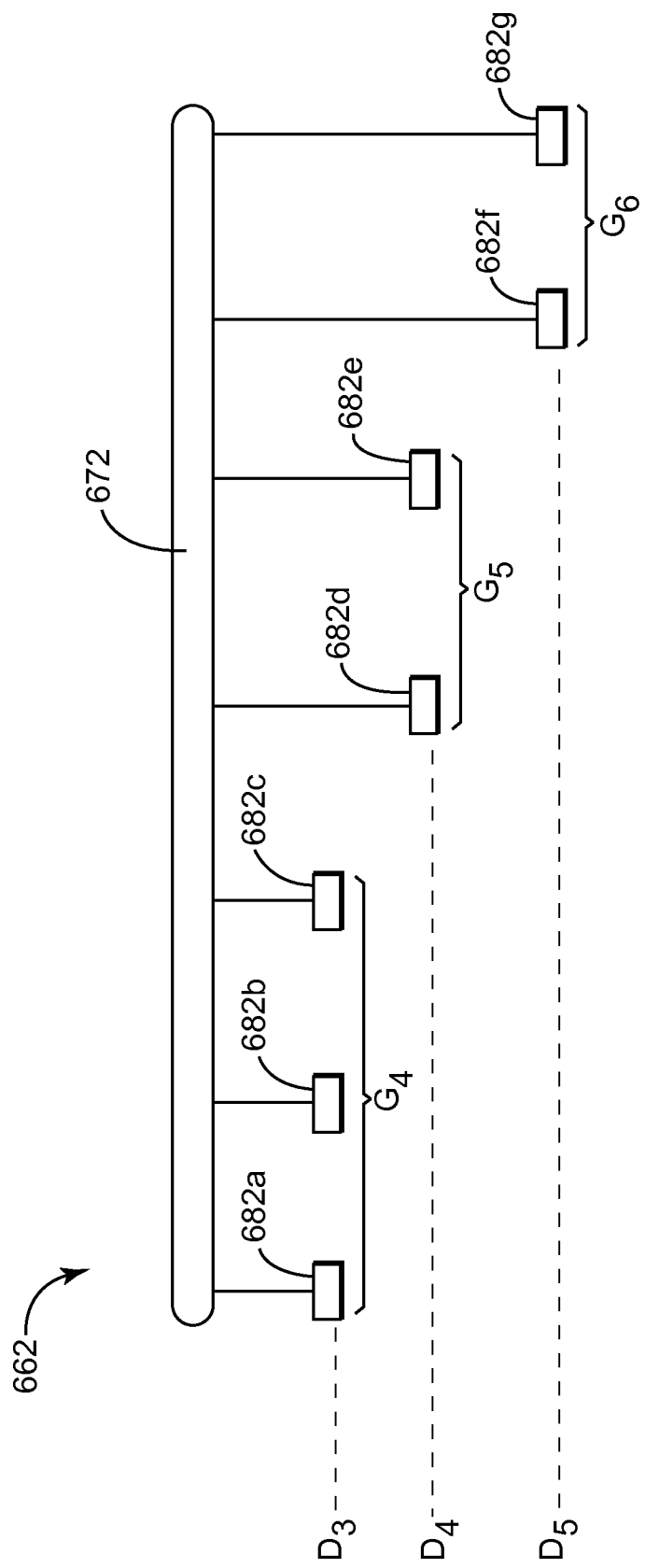

According to another exemplary embodiment, illustrated in FIG. 6B, the source points do not follow the imaginary line 514 or 524 or 534, but rather groups of the source points follow these lines. FIG. 6B is a top view of an exemplary source 650 that has three sub-arrays 660, 662 and 664. The source points for each sub-array are grouped in groups G1 to G9, each group including at least one source point. The groups are distributed at different depths D1 to D5. A side view of the first sub-array 660 is shown in FIG. 6C, and this view illustrates that each group is provided at a given depth and there is a step increase (or other increase) from a group to the next group. For example, the increase may follow, as discussed above, a straight line or a curve (e.g., parabola, circle, hyperbola, etc.). Two or more sub-arrays may have the same depth distribution for the point sources. FIG. 6C shows the first sub-array 660 including a float 670 and at least seven source points 680a to 680g. Umbilicals 682 connect adjacent source points for providing the power, data and/or compressed air as necessary for the operation of the devices making up the source points. FIG. 6D is a side view of the second sub-array 662, which includes a float 672 and plural source points 682a to 682g. Although the depth of group G4 is shown to be the same as the depth of group G3 of the first sub-array, in one embodiment it is possible that each group has a unique depth. Further, the number of source points that belong to one group may vary between one and N, where N is a positive integer number.

A ratio between the shallowest source and the deepest source in the source array 600 or 650, e.g., between source point 510a and source point 530d, may be 2.5, i.e., h4/z1=2.5. Depending on the type of survey, this ratio may be modified accordingly, e.g., to be 1.5.

By having many depth levels for the source points of the source array, over an extended ratio of depths (e.g., 2.5:1), the novel source array can achieve strong low-frequency energy, a smooth spectrum, and it is almost free of high-frequency ghost notches. These conflicting requirements require the use of more system variables and, by providing many source point depths, more system variables are accessed for achieving the conflicting objectives.

As previously noted, a source point may be an airgun. Other type of marine sources (e.g., water gun, vibratory source, etc.) may be used instead of the airgun. Also, the embodiments illustrated in FIGS. 6A-D are exemplary. This means that many other configurations may be envisioned to achieve the depth diversity for the source points. For example, one sub-array may have the source points distributed deeper as the distance from the head of the float increases, while a next sub-array has the source points distributed deeper as the distance from the tail of the float increases. Further, the number of source points connected to one float may vary. FIG. 6A shows four source points per float as an exemplary embodiment and not intended to limit the invention.

Figure 7A:
FIGS. 7A-B are schematic diagrams illustrating a source point according to an exemplary embodiment.
Figure 7B:
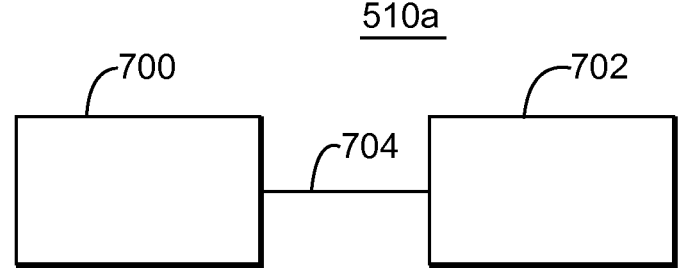

Furthermore, a source point may include one or more guns. For example, as shown in FIG. 7A, a single source point 510a includes nothing else than a single device, e.g., an airgun. However, if multiple devices are provided together as a source point, a distance between these multiple devices is so chosen that their waves coalesce. FIG. 7B shows two independent source points 700 and 702 connected to each other by a mechanical link 704. In this case, the mechanical link 704 is employed to maintain a relative distance between the source points, and each of the source points 700 and 702 is configured to generate its own seismic wave. The mechanical link 704 may be configured to be shorter than, e.g., 1.5 m, so that the waves emitted by the source points 700 and 702 coalesce and appear as a single seismic wave. In one embodiment, two airguns form a source point, but one air gun may be active and the other one may be kept for redundancy or other purposes. More or fewer source points may be attached to a single float.

Figure 9:
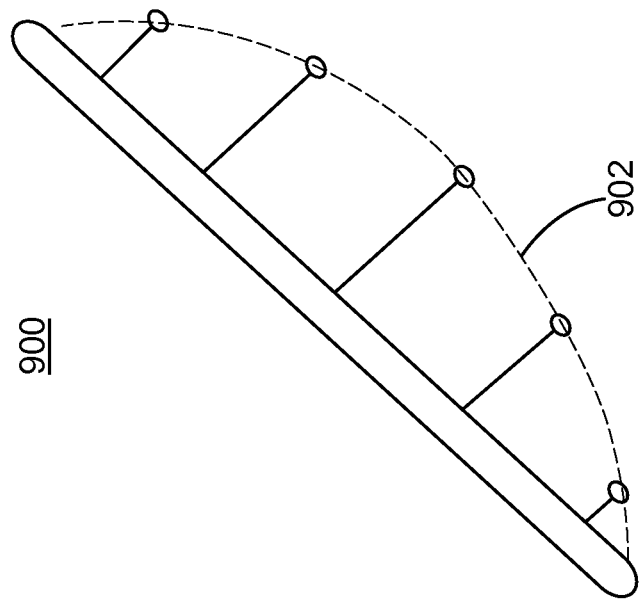
FIG. 9 is a schematic diagram of yet another variable-depth seismic source according to an exemplary embodiment.
Figure 8:
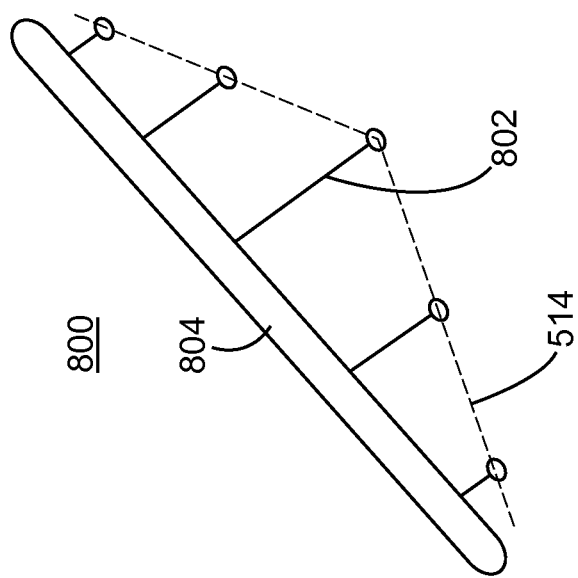
FIG. 8 is a schematic diagram of still another variable-depth seismic source according to an exemplary embodiment.

The source points may be distributed in other ways along a float as illustrated in FIGS. 8 and 9. FIG. 8 shows an embodiment in which a source sub-array 800 has source points slanted downward, up to a maximum distance 802 from the float 804, after which the source points are slanted upward. FIG. 9 shows an alternative embodiment 900 in which the source points are provided on a curved line 902. The curved line may be, as previously discussed, a part of a parabola, hyperbola, circle, etc. If the same curved line profile is used for the source points for all three sub-arrays that make up a source array (e.g., the source points are provided on the surface of a cylinder), then the source array may generate cylindrical acoustic waves if the source points are fired appropriately. Alternatively, the source array may be configured so that the source points are provided on a spherical surface, i.e., each curved profile is part of a circle, with the first and the third sub-arrays having a same radius and the second sub-array having a different radius (e.g., larger than the first and the third sub-arrays). In this case, the source array may be configured to generate spherical waves.

Figure 10:
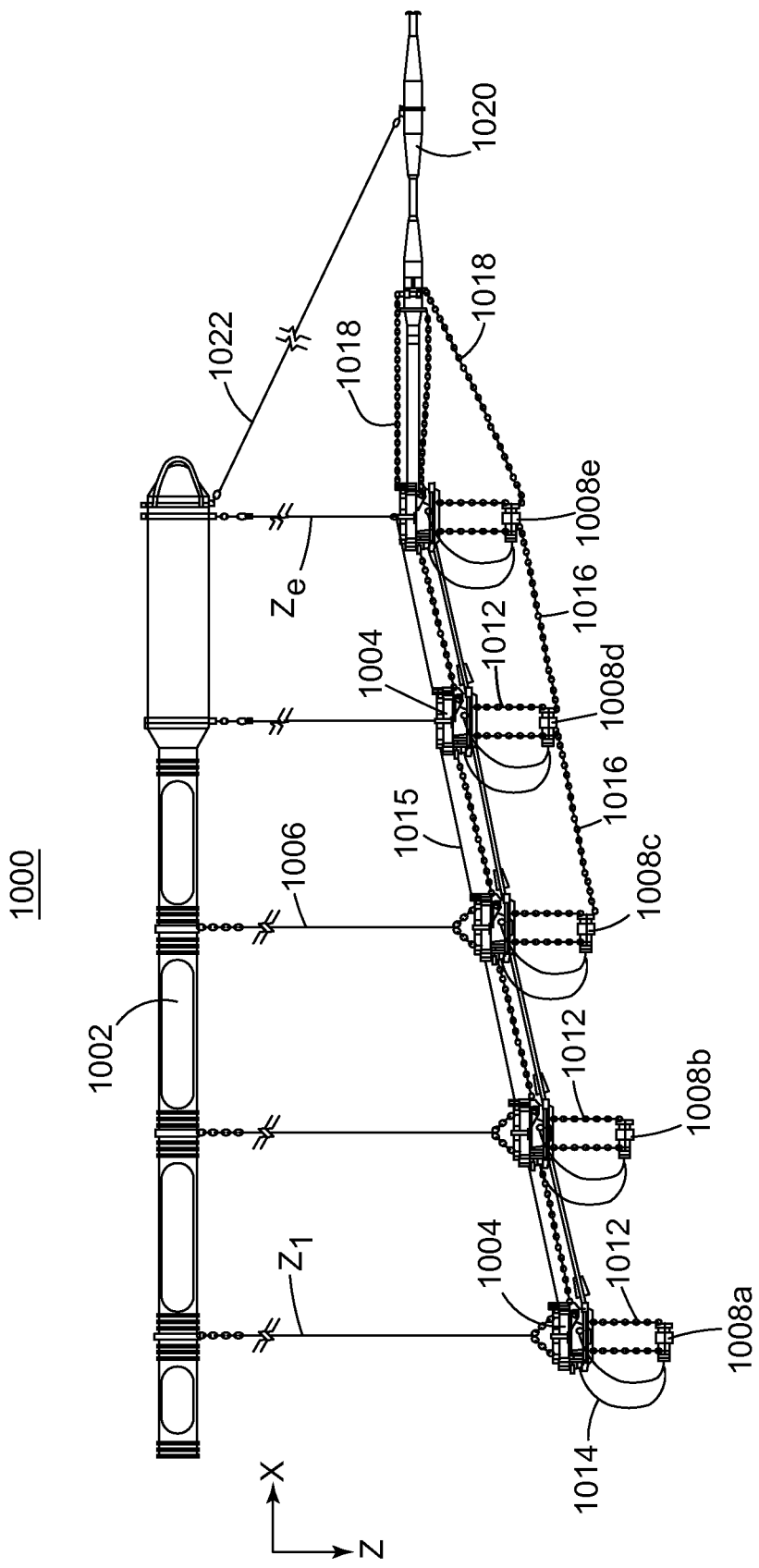
FIG. 10 is a schematic diagram of a stepped seismic source according to an exemplary embodiment.

In one other exemplary embodiment illustrated in FIG. 10, the links among the source points and the connections to the towing vessel (not shown) are illustrated. The source array 1000 includes a float 1002 from which multiple plates 1004 are suspended at given depths, e.g., z1 to ze. In one application, there is a plate 1004 for each source point. In another application, there is a single plate 1004 for all source points. The float 1002 has a body that extends along a longitudinal axis (X). Although the exemplary embodiments discussed herein show a straight line float, it is noted that other shapes may be used for the float, e.g., circle, ellipse, etc. Cables 1006 may be used to suspend the plates 1004 from the float 1002. Plural source points 1008a to 1008e form the first sub-array. All the source points are suspended from the same float 1002 via links 1012 that substantially extend on a vertical axis (Z). Each source point may have its own cables 1014 (electrical, compressed air, data, etc.) for controlling and activating the source point (it is noted that these cables are not shown for all the sources). The cables may be protected by a housing 1015. In order to achieve the slanted profile shown in FIG. 10, the length of the cables 1006 needs to be changed when a traditional source array is modified based on the novel concept discussed above. In one application, the length of the housing 1015 stays substantially the same when the depths of the source points are adjusted, which makes easier the implementation of this method in the field.

In other words, as will be recognized by those skilled in the art, the connections between the plates 1004 and source points 1008a-e and also among the various source points 1008a-e are difficult to modify and/or change. Thus, the slanted source modifies the length of the cables 1006 to achieve the desired variable-depth profile and not the other links or cables.

Some of the source points may optionally be connected to each other by various means 1016, e.g., rods, chains, cables, etc. A front portion of the first plate 1004 and the first source point 1008e also may be connected via a connection 1018 to an umbilical 1020 that may connected to the vessel (not shown). Optionally, a link 1022 may connect the float 1002 to the umbilical 1020. The umbilical 1020 includes various cables and hoses for providing data, power and compressed air to and from the source points. In one application, three or more of such floats 1002 and corresponding source points may form the source array 1000.

Figure 11:
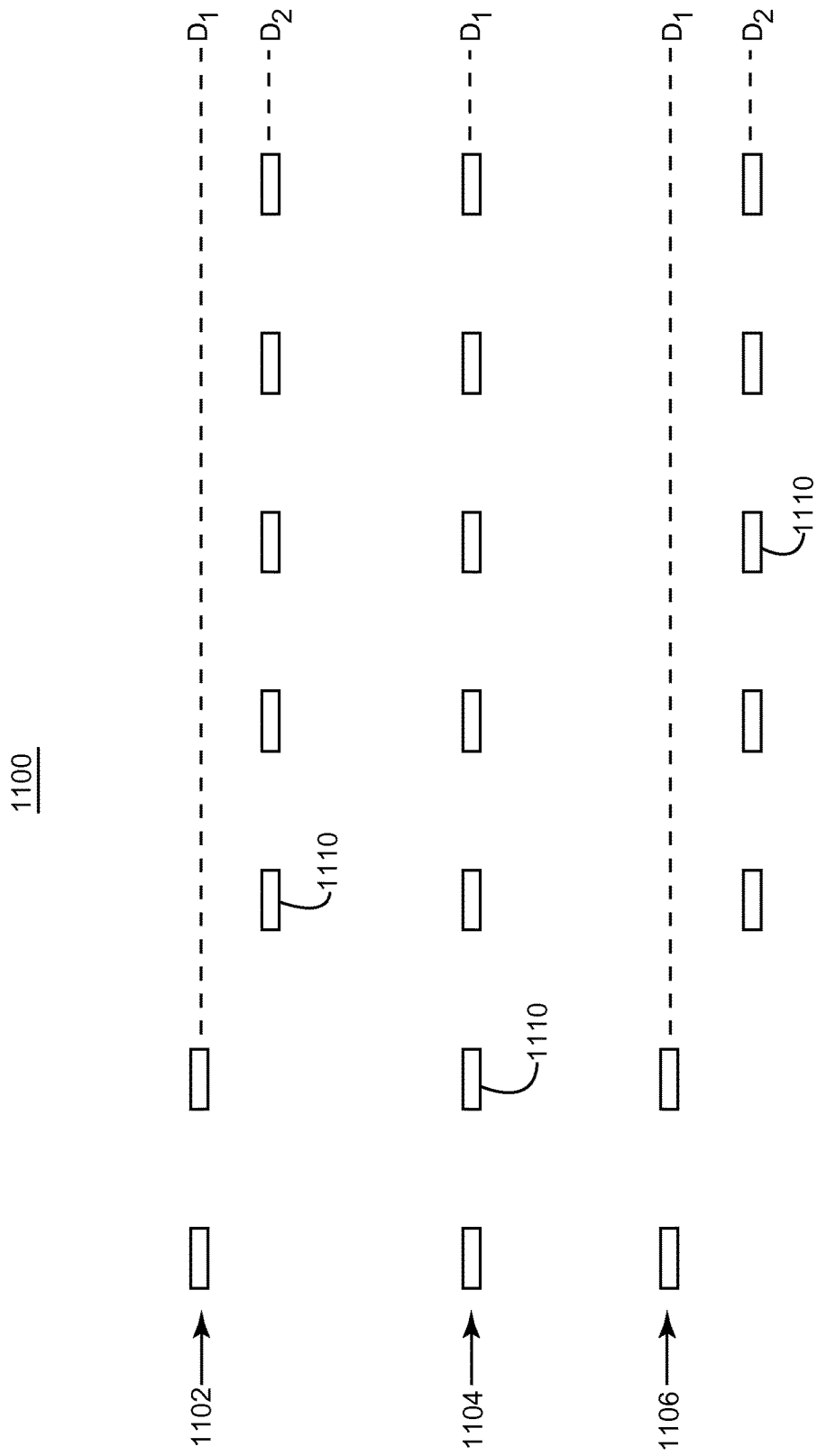
FIG. 11 is a schematic diagram of another variable-depth seismic source according to an exemplary embodiment.

According to another exemplary embodiment illustrated in FIG. 11, a source array 1100 includes three sub-arrays 1102, 1104 and 1106. Some sub-arrays include at least seven air guns 1110 provided at two depth levels D1 and D2. For example, D1 may be around 5 m and D2 may be around 7.5 m. In another application, the ratio D2 to D1 is about 1.5. Those skilled in the art would recognize that other depth levels may be used as appropriate. In one application, it is noted that the depth (D1 and D2) distributions of the source points for the first sub-array 1102 and the third sub-array 1106 are identical, while the depth (D1) distribution of the source points for the second sub-array 1104 is different. The depth distribution shown in FIG. 11 does not entirely fit a stepped/slanted source as discussed in the previous embodiments because only some source points are provided on a slanted or curved line while the remaining source points are provided on a horizontal line. Further, the second sub-array has all the source points provided on a horizontal line. Variations of this configuration are also contemplated, i.e., the second sub-array having at least two different depths, or at least one of the sub-arrays having a slanted or curved source points distribution.

Figure 12:
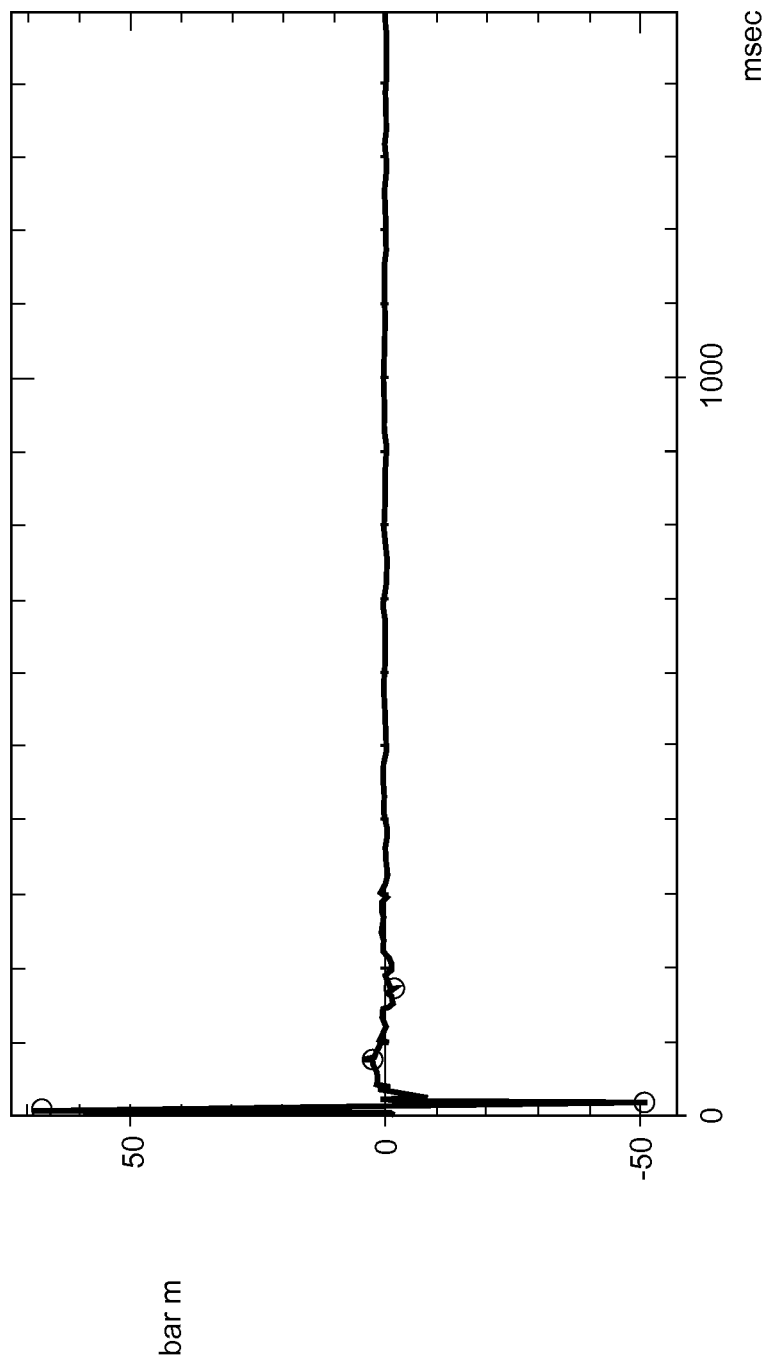
FIGS. 12 and 13 are graphs of farfield signature and amplitude spectrum of a variable-depth seismic source according to an exemplary embodiment.
Figure 13:
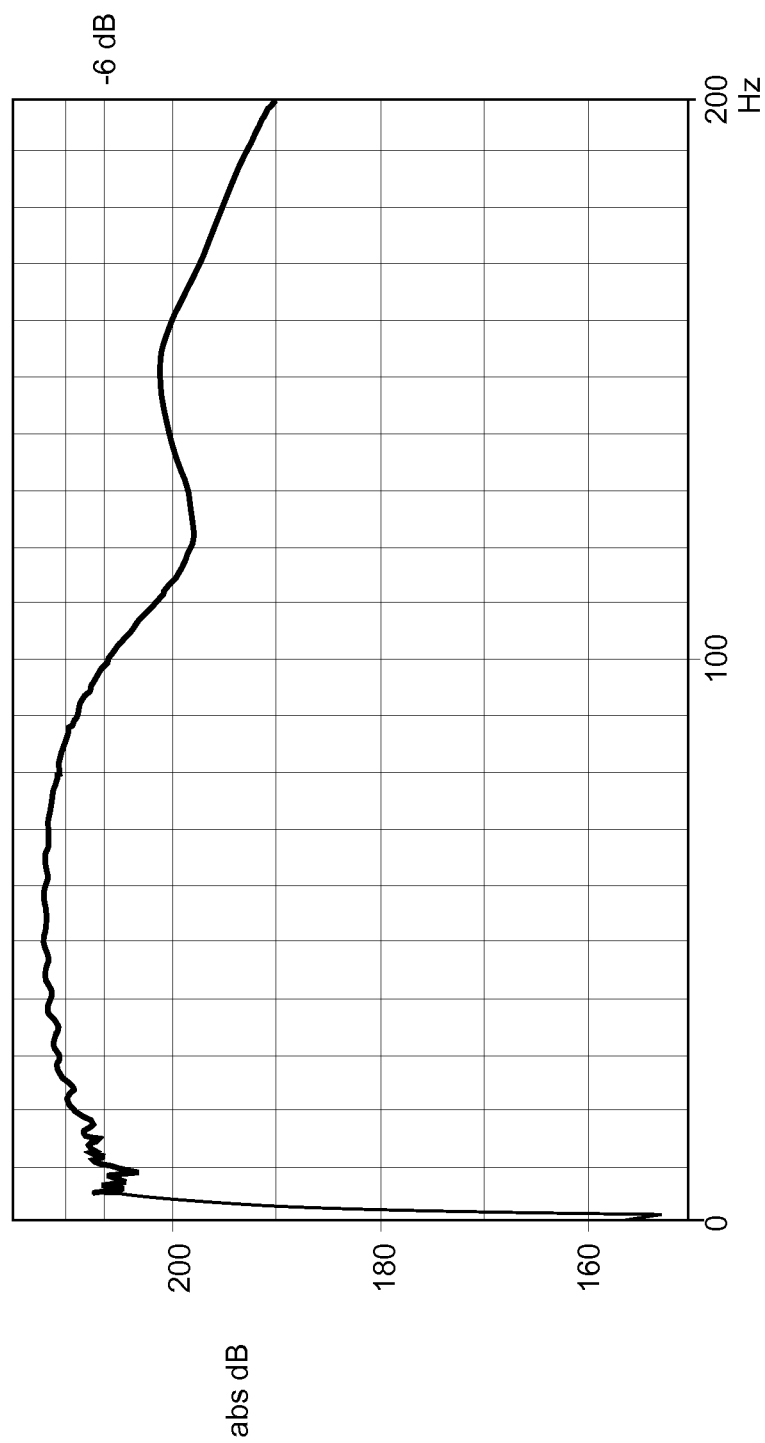
Figure 14:
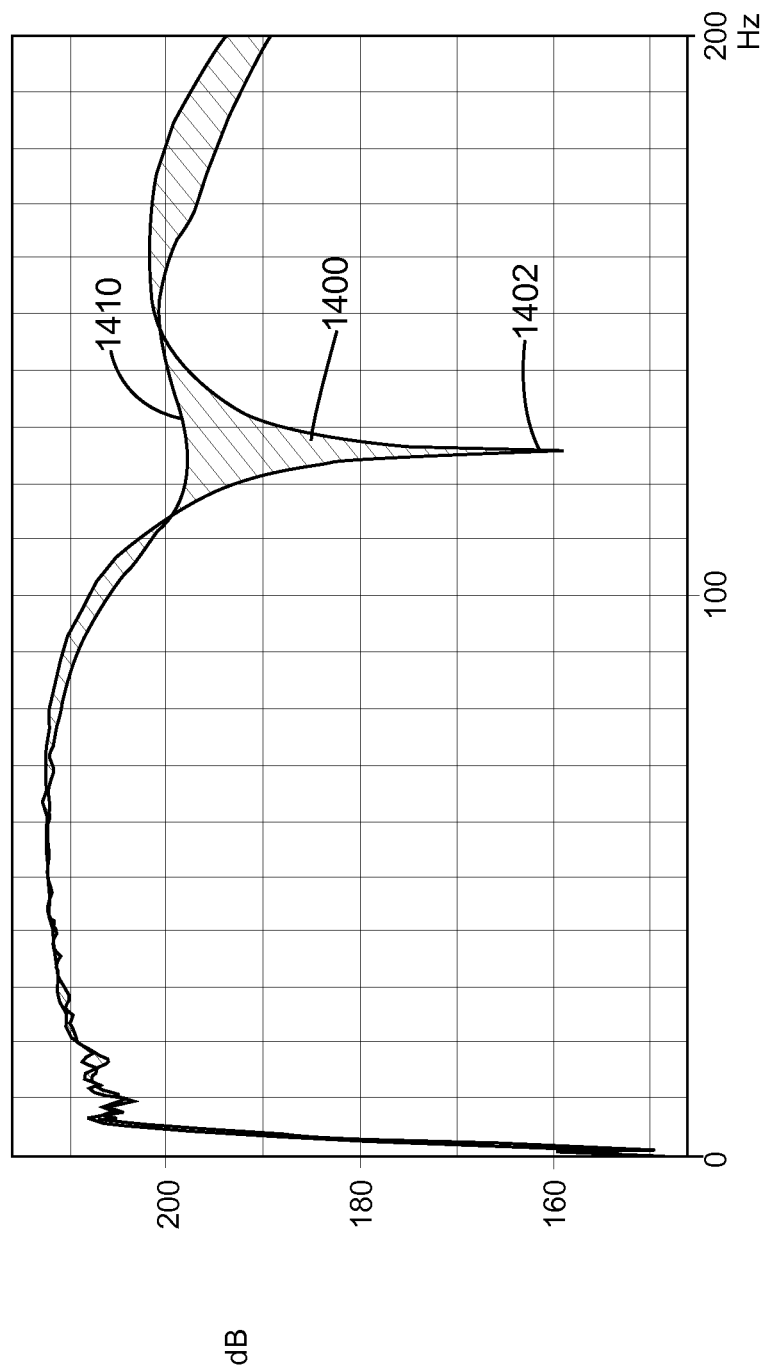
FIG. 14 is a graph comparing the spectra of a reference seismic source and a variable-depth seismic source according to an exemplary embodiment.

Using specialized software typical for the industry, the time signature and the amplitude spectrum of the novel source array 1100 and a reference source were calculated as illustrated in FIGS. 12 and 13. FIG. 12 shows a time signature (pressure versus time measured at the source array), and FIG. 13 shows the amplitude spectrum of the novel source array of FIG. 11. FIG. 14 shows amplitude spectrum 1400 of the traditional source array superimposed over the amplitude spectrum 1410 of the novel source array of FIG. 11. It is noted the notch 1402 of the traditional source and the lack of it in the amplitude spectrum 1410 of the novel source 1100.

Figure 15:
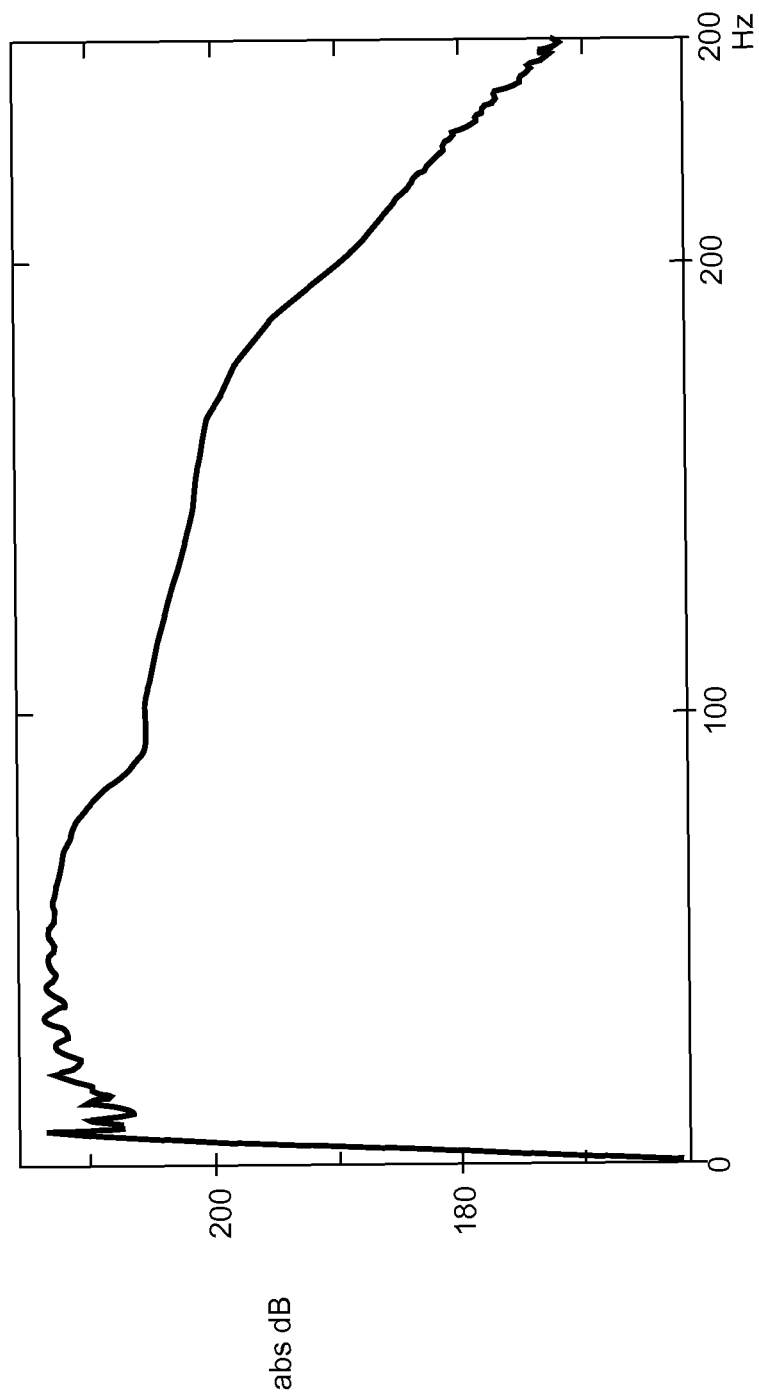
FIG. 15 is a graph of an amplitude spectrum of a variable-depth seismic source according to an exemplary embodiment.

The amplitude spectrum of the novel source array illustrated in FIGS. 5-10 is illustrated in FIG. 15. More specifically, FIG. 15 shows the amplitude spectrum for the novel source array shown in FIG. 6B. It is noted the reduction of the ghost at around 100 Hz when compared with the traditional source, but also with the novel source array illustrated in FIG. 11.

Figure 16:
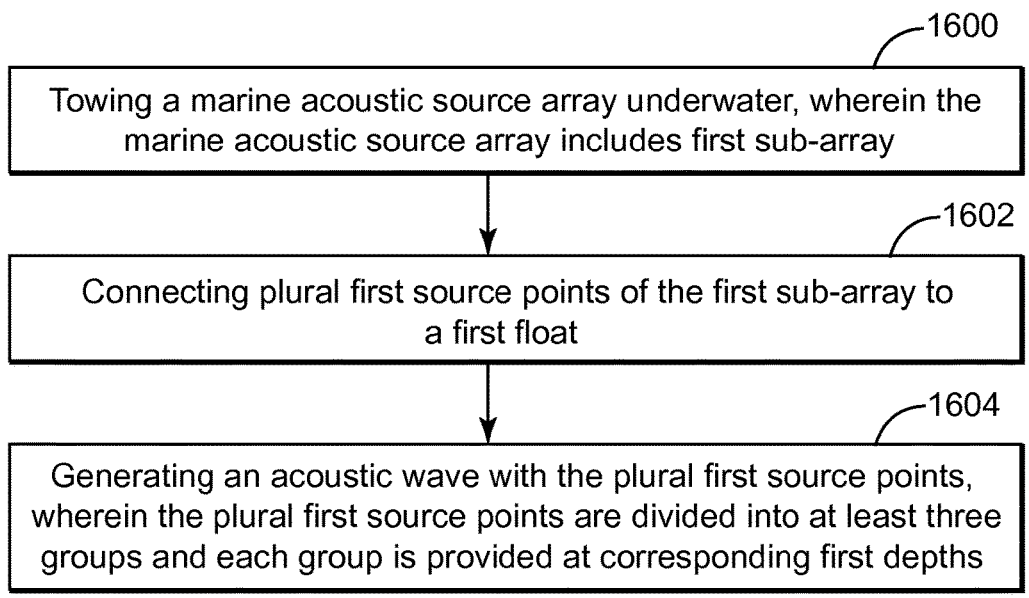
FIG. 16 is a flowchart of a method for using a variable-depth seismic source according to an exemplary embodiment.

According to an exemplary embodiment, a method for generating an acoustic wave underwater is now discussed with reference to FIG. 16. The method includes a step 1600 of towing a marine acoustic source array underwater, wherein the marine acoustic source array includes a first sub-array, a step 1602 of connecting plural first source points of the first sub-array to a first float, and a step 1604 of generating the acoustic wave with the plural first source points, wherein the plural first source points are divided into at least three groups (G1 to G3), and each group is provided at corresponding first depths (D1 to D3).

Figure 17:
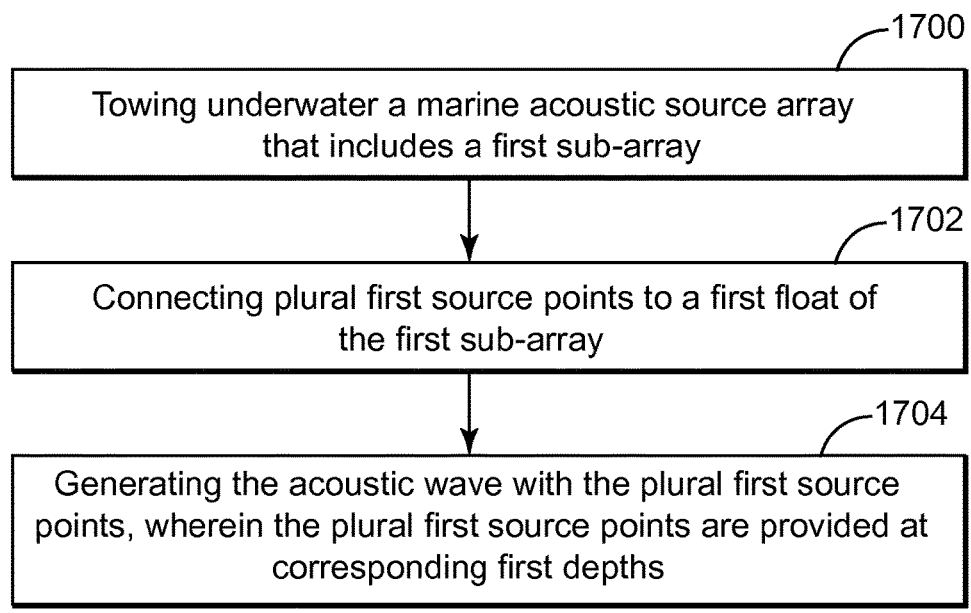
FIG. 17 is a flowchart of a method for using another variable-depth seismic source according to an exemplary embodiment.

According to still another exemplary embodiment, there is a method for generating an acoustic wave underwater as illustrated in FIG. 17. The method includes a step 1700 of towing underwater a marine acoustic source array that includes a first sub-array, a step 1702 of connecting plural first source points to a first float of the first sub-array, and a step 1704 of generating the acoustic wave with the plural first source points, wherein the plural first source points are provided at corresponding first depths (z1 to z4), each first depth being different from other first depths.

The above embodiments were discussed without specifying what type of seismic receivers are used to record the seismic data. In this sense, it is know in the art to use, for a marine seismic survey, streamers that are towed one or more vessels and the streamers include the seismic receivers. The streamers may be horizontal or slanted or having a curved profile as illustrated in FIG. 18.

Figure 18:
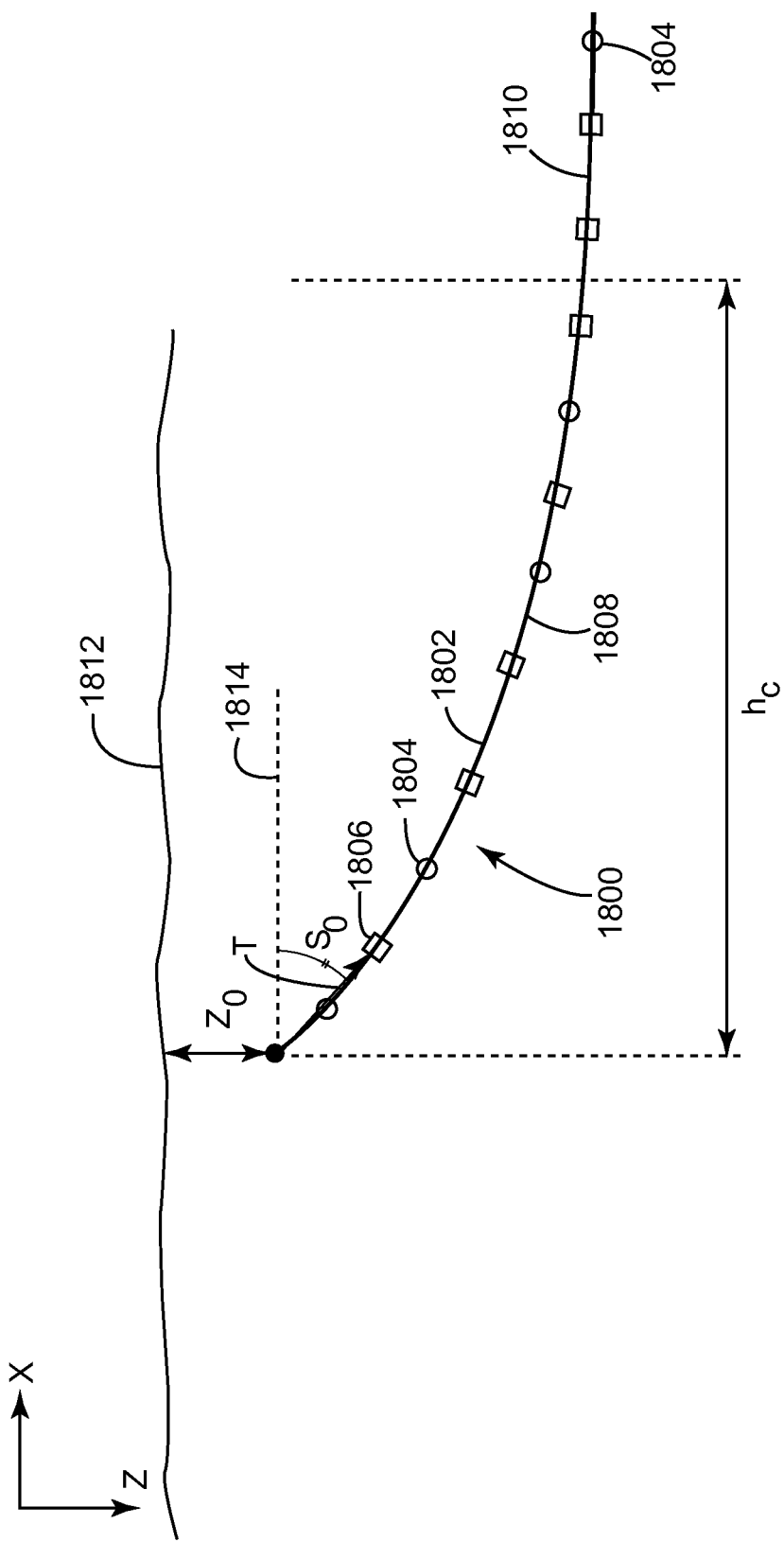
FIG. 18 illustrates a curved streamer.

The curved streamer 1800 of FIG. 18 includes a body 1802 having a predetermined length; plural detectors 1804 provided along the body; and plural birds 1806 provided along the body for maintaining the selected curved profile. The streamer is configured to flow underwater when towed such that the plural detectors are distributed along the curved profile. The curved profile may be described by a parameterized curve, e.g., a curve described by (i) a depth $z_0$ of a first detector (measured from the water surface 1812), (ii) a slope $s_0$ of a first portion T of the body with an axis 1814 parallel with the water surface 1812, and (iii) a predetermined horizontal distance $h_c$ between the first detector and an end of the curved profile. It is noted that not the entire streamer has to have the curved profile. In other words, the curved profile should not be construed to always apply to the entire length of the streamer. While this situation is possible, the curved profile may be applied only to a portion 1808 of the streamer. In other words, the streamer may have (i) only a portion 1808 having the curved profile or (ii) a portion 1808 having the curved profile and a portion 1810 having a flat profile, the two portions being attached to each other.

One or more of the exemplary embodiments discussed above produces a better broadband source array while the source array suppresses notches in the amplitude spectrum by having the individual source points provided at different depths relative to the surface of the water or the float. Further, existing floats may be used for the novel source array with minimal modifications. The existing floats do not have to be straight floats but may be of other types as known in the art, e.g., floats used with the fan source or tower source.

The disclosed exemplary embodiments provide a system and a method for providing a stepped broadband source array. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine acoustic source array for generating an acoustic wave in a body of water, the marine acoustic source array comprising:
    a first sub-array configured to be towed by a vessel, the first sub-array including a first float and plural first source points connected to the first float,
    wherein the plural first source points are divided into at least three groups (G1 to G3), each group is provided at corresponding distinct first depths (D1 to D3), includes plural source points and is attached to a corresponding region of the first float, and any two groups do not share a same corresponding region of the first float,
    wherein the first depths form an imaginary first curved line.

2. The source array of claim 1, further comprising:
    a second sub-array configured to be towed by the vessel and having plural second source points, wherein the plural second source points are divided into at least three groups (G4 to G6) and each group is provided at corresponding second depths.

3. The source array of claim 2, wherein the first depths are different from the second depths.

4. The source array of claim 2, wherein the first depths overlap with the second depths.

5. The source array of claim 1, wherein the first depths increase from a head of the first float toward a tail of the first float.

6. The source array of claim 1, wherein plural second source points that form a second sub-array are divided into at least three groups (G4 to G6) and each group is provided at corresponding second depths, and the second depths form an imaginary straight line.

7. The source array of claim 1, wherein plural second source points that form a second sub-array are divided into at least three groups (G4 to G6) and each group is provided at corresponding second depths and the second depths form an imaginary second curved line.

8. The source array of claim 7, wherein the second curved line is identical to the first curved line so that the source array has the plural first and second source points distributed on a cylindrical surface.

9. The source array of claim 7, wherein the first and second curved lines are parts of a circle but have different radiuses so that the source array has the plural first and second source points distributed on a spherical surface.

10. The source array of claim 1, wherein the plural second source points that form a second sub-array are divided into at least three groups (G4 to G6) and each group is provided at corresponding second depths and the second depths form an imaginary straight line.

11. The source array of claim 1, wherein a ratio of (i) a shortest depth of the first depths and (ii) a longest depth of the first depths is about 2.5.

12. A marine acoustic source array for generating an acoustic wave in a body of water, the marine acoustic source array comprising:
    a first sub-array configured to be towed by a vessel, the first sub-array including a first float and plural first source points connected to the first float,
    wherein each of the plural first source points is provided at a corresponding first depth, each first depth being different from other first depths, the first depths forming a first curved line.

13. The source array of claim 12, further comprising:
    a second sub-array having plural second source points, wherein the plural second source points are provided at corresponding second depths, each second depth being different from other second depths.

14. The source array of claim 12, wherein plural second source points that form a second sub-array are provided at corresponding second depths, each second depth being different from other second depths, and the second depths form a second curved line.

15. The source array of claim 12, wherein plural second source points that form a second sub-array are provided at corresponding second depths, each second depth being different from other second depths, and the second depths form a straight line.

16. The source array of claim 12,
wherein plural second source points that form a second sub-array are provided at corresponding second depths, each second depth being different from other second depths, and the second depths form a second curved line, and
wherein the second curved line is identical to the first curved line so that the source array has the plural first and second source points distributed on a cylindrical surface.

17. A method for generating an acoustic wave underwater, the method comprising:
towing underwater a marine acoustic source array that includes a first sub-array;
connecting plural first source points to a first float of the first sub-array; and
generating the acoustic wave with the plural first source points, wherein each of the plural first source points is provided at a corresponding first depth, each first depth being different from other first depths, the first depths forming a first curved line.

* * * * *